C. B. EARNHEART.
PRESSURE INDICATING AIR VALVE.
APPLICATION FILED JULY 24, 1916.
1,305,263.
Patented June 3, 1919.
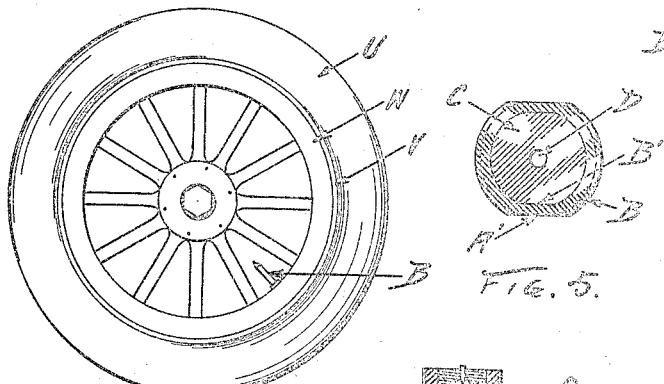
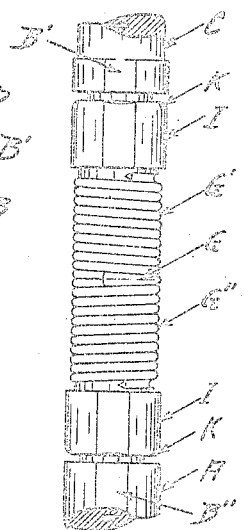
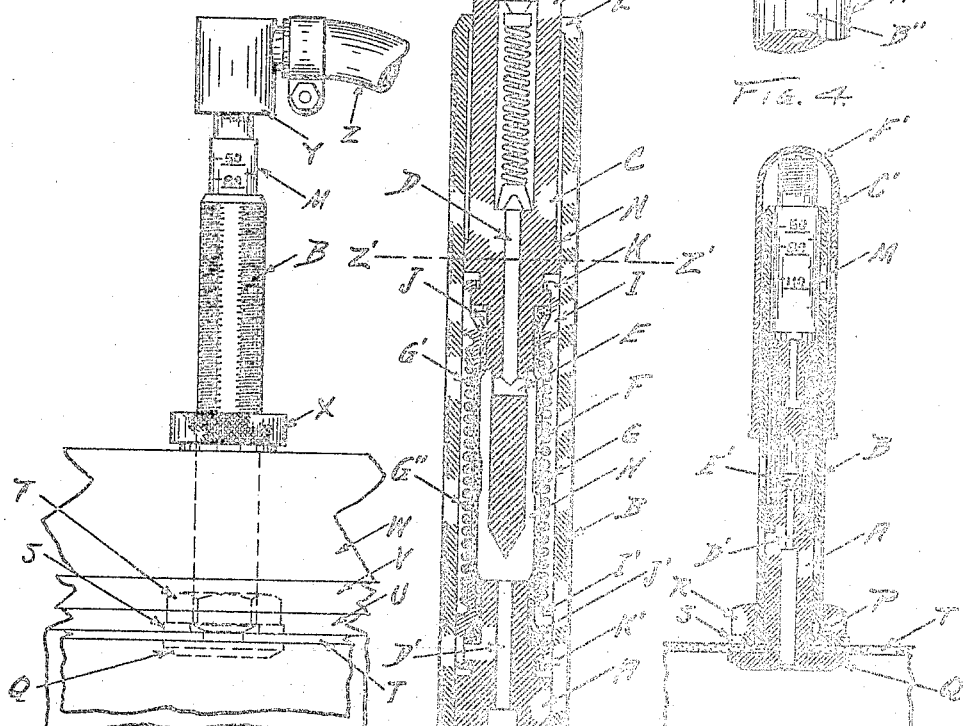
INVENTOR
Chauncey B. Earnheart
ATTORNEYS

UNITED STATES PATENT OFFICE.

CHAUNCEY B. EARNHEART, OF INDIANAPOLIS, INDIANA, ASSIGNOR TO SAFETY FIRST DEVICES COMPANY, OF INDIANAPOLIS, INDIANA, A CORPORATION.

PRESSURE-INDICATING AIR-VALVE.

1,305,263.

Specification of Letters Patent.   Patented June 3, 1919.

Application filed July 24, 1916.   Serial No. 110,997.

*To all whom it may concern:*

Be it known that I, CHAUNCEY B. EARNHEART, a citizen of the United States, and a resident of Indianapolis, county of Marion, and State of Indiana, have invented a certain new and useful Pressure-Indicating Air-Valve; and I do hereby declare that the following is a full, clear, and exact description thereof, reference being had to the accompanying drawings, in which like letters refer to like parts.

This invention is a pressure indicating air valve for pneumatic tires and other receptacles for holding fluid under pressure.

One feature of the invention consists in so constructing a valve stem and the valve carrying member which is slidable therein that they will always be maintained in the same angular relation to each other, that is, with the valve carrying member having no rotary movement within the valve stem and yet being free to have slidable movement longitudinally of the valve stem. Pressure indicating numerals and graduations are placed on two opposite sides of said valve carrying member for indicating the pressure within a pneumatic tire or the like and it is desirable that as the valve carrying member in the valve stem moves inward or outward in the valve stem, the two series of indicating numerals and graduations should always be in their proper positions, facing the two sides of the automobile wheel.

Another feature of the invention herein consists in the use of a double spiral spring for connecting the inner portion of the valve carrying member with the valve stem so as to permit the longitudinal movement of the valve carrying member as, for instance, when actuated by the pressure of the air in the pneumatic tire. Half of said spiral spring is wound in one direction and the other half thereof is wound in the opposite direction so that as said double spring expands or contracts, it will not tend to turn or change the angle or position of the valve carrying member and the pressure indications thereon. In such construction where there is a single spring or a spring coiled in one direction only, when said spring expands or contracts, it tends to turn or change the angle or position of said valve carrying member within the valve stem and causes it often to lock, catch or stick in the valve stem. With this double spring construction this difficulty is avoided and the valve carrying member will always move outward or inward straight and without any tendency to turn in either direction and lock or stick in the valve stem. This is important because such constructions are relatively small and close fitting, and, therefore, there is great danger of the pressure indicating means or valve carrying member sticking in the valve stem and not accurately indicating the pressure in the pneumatic tire, or the condition of the main valve whether it is closed or not.

The full nature of the invention will be understood from the accompanying drawings and the following description and claims:

In the drawings, Figure 1 is a side elevation of a portion of a vehicle wheel and pneumatic tire and said pressure indicating air valve secured in place thereon. Fig. 2 is a central vertical section through a portion of the inner tube and through the air valve, said parts of said air valve being in their closed position. Fig. 3 is a central longitudinal section of the outer portion of the air valve with the dust cap removed and the parts of the air valve shown in their positions when the air valve is open. Fig. 4 is an elevation of the central portion of the valve carrying member on the same scale as Fig. 2. Fig. 5 is a section on the line Z'—Z' of Fig. 3. Fig. 6 is a side elevation of an automobile wheel with said air valve in place.

There is shown herein an automobile wheel of usual type having a felly W, a detachable rim V, an outer casing U and an inner tube T. The valve stem A extends through the inner tube and the parts of the wheel as usual and has on its inner end a head Q within the inner tube and there is an air passage D' with the outer portion thereof reduced. On said valve stem there is a sleeve B longer than the valve stem and secured thereto by its inner end being turned into an annular recess or groove in the valve stem near the head Q. Said sleeve is externally threaded throughout its length and it and the valve stem are clamped in place on the inner tube by a jam nut R and a washer S.

The valve carrying member C is longitudinally slidable in the sleeve B and at its inner end it has a main valve E' in the form of a needle valve which is adapted to enter and tightly close the upper end of the reduced portion of the air passage D', when the valve carrying member C is forced inward. Said needle valve is surrounded by a rubber tube F, the inner end of the rubber tube surrounding the reduced outer end of the valve stem and being held thereon by a sleeve I', the inner end of the sleeve being turned inward at K' into an annular recess or groove surrounding said valve stem. The inner portion of said sleeve is contracted and wedges against the washer J'.

The rubber tube F is of greater diameter than the needle valve so as to leave an air chamber H between them, as shown in Fig. 3. This air chamber is in communication with the air passage D' in the valve stem and also with the horizontal air passage E extending diametrically through the valve stem and the longitudinally reduced air passage D in the inner portion of the valve carrying member and an enlarged air passage in the outer portion of the valve carrying member, which portion of the air passage however contains and is controlled by a check valve O of usual type.

A portion M of the valve carrying member is provided with numerals, as shown in Figs. 1 and 2, for indicating the air pressure. When the graduation immediately under any one of said numerals registers with the outer end of the sleeve B, the air pressure in the pneumatic tire is indicated by such numeral. In order to distribute the graduations so as not to bring them too close together and cause confusion there is a ten pound graduation dial below and to the right of each central graduation, and then there is another ten pound graduation above and to the left of each central graduation. Therefore, only a few numerals are required and the adjacent numerals may be thirty pounds apart, the space between two adjacent central graduations representing thirty pounds is divided into three ten pound sections by the right, left and center graduations.

The valve carrying member C has an annular shoulder N fitting snugly within the sleeve B and said sleeve at its outer end has an inturned flange or shoulder L which fits snugly around the valve carrying member so that they will properly coöperate and one cannot escape from the other. There is an air tube Z, connected with any source of fluid under pressure, through which air is introduced into the tire through said air valve. This, however, may be of any usual construction.

The double spring is preferably made, as shown in Fig. 4, by taking two springs G' and G'' coiled in opposite directions and securing their adjacent ends by a tapering sleeve G into which the tapering ends of the wires of the two springs are forced and secured. There is also a dust cap C' of usual type which screws on the sleeve B.

The mode of operation of the device is as follows: When the dust cap is removed for the purpose of charging a tire, the parts of the valve will assume the positions shown in Fig. 3, and air can enter the tire through the valve from the supply tube Z which is applied to the outer end F' of the valve carrying member C by the usual nipple Y. The air passes through the passages D, E, H and D'. As the air pressure in the tire and valve increases, the valve carrying member C will be correspondingly pushed outward gradually until the desired pressure is attained, say 90 pounds, as shown in Fig. 1, and then the nipple Y is removed and the air check O will prevent the escape of the air as usual.

After the tire has been charged, as above explained, the dust cap C' is put in place on the sleeve B and screwed down until its outer end engages the outer end of the valve carrying member at F' and forces said valve carrying member inward until the needle valve E' is positively seated and closes the air passage D' in the valve stem, as shown in Fig. 2. The dust cap acting through the valve carrying member will hold said valve E' positively seated and prevent any possible leakage of air through the valve stem, as is a very common trouble.

There are two sets of indicating numerals and graduations on the portion M of the valve carrying member, on the opposite sides thereof so that the same may be easily read from either side of the tire. To maintain said indicating numerals and graduations in such convenient positions for reading, it is important that the valve carrying member C shall not have any turning or angular movement in the sleeve B. Hence, said sleeve B is flattened at A' longitudinally thereof and likewise said valve carrying member C is flattened longitudinally thereof, as shown in Fig. 5, the two flattened sides of the said two members registering with each other, as there shown.

Since the parts of the device are small and close fitting, there is danger of the valve carrying member C being given some slight turning or angular movement so as to wedge it into the sleeve B and prevent its free reciprocation in the sleeve and often, therefore, presenting a false reading of the air pressure. This is overcome by the double spring, as heretofore explained, so that as the double coil spring G' and G'' expands and contracts, it will not tend to give any turning movement to the valve carrying member. The single spiral spring would tend to turn the valve carrying member in one direction, but the other spiral spring oppositely coiled will tend to turn it in the opposite direction and since said two springs are about the same length and have substantially the same strength, one neutralizes the action of the other and hence, said valve carrying member is never given any turning or angular movement and, therefore, never wedges or sticks, but moves inwardly freely and always accurately indicates the pressure in the tire; and this is true not only while the tire is being charged, but while it is being used. At any time the air pressure in the tire can be learned by merely removing the dust cap.

The invention claimed is:

1. An air valve for pneumatic tires, tanks or other receptacles for air under pressure including a stationary tubular member, a member longitudinally and yieldingly movable in said stationary member and always directly subject to the influence of the air pressure in said tire, tank or other receptacle and having pressure indications thereon to indicate the pressure of the air, and a needle valve integral with the movable member adapted to engage and close communication through the stationary member, said two members being formed so that the inner member can have no turning or angular movement within the other member.

2. An air valve for pneumatic tires, tanks or other receptacles for air under pressure including a stationary tubular member, a member longitudinally and yieldingly movable in said stationary member and always directly subject to the influence of the air pressure in said tire, tank or other receptacle and having on two opposite sides thereof series of pressure indications to indicate the pressure of the air, and a needle valve integral with the movable member adapted to engage and close communication through the stationary member, said two members being formed so that the inner member can have no turning or angular movement within the other member.

3. An air valve for pneumatic tires, tanks or other receptacles for air under pressure including a valve stem secured to the tire, tank or other receptacle and having an air passage therethrough, a sleeve on said stem, a member longitudinally movable in said sleeve and flexibly connected with said stem and always subject to the influence of the air pressure in said tire, tank or other receptacle and in said valve stem and having pressure indications thereon to indicate the pressure of the air, and a needle valve integral with the movable member adapted to engage and close communication through the stationary member, said sleeve and indicating member being so formed that the indicating member can have no turning or angular movement within the other member.

4. An air valve for pneumatic tires, tanks or other receptacles for air under pressure including a valve stem secured to the tire, tank or other receptacle and having a free air passage therethrough and with its outer portion tubular, a valve carrying member longitudinally movable in said tubular portion of the valve stem and carrying a stationary valve for controlling the air passage through the valve stem, said valve carrying member having pressure indications thereon, and a pair of oppositely wound connected springs for yieldingly mounting said valve carrying member and yieldingly resisting its movement under the influence of the air pressure in said tire, tank or other receptacle and in the valve stem, said valve carrying member and the tubular portion of the valve stem being so formed that the inner member can have no turning or angular movement within the other member.

5. An air valve for pneumatic tires, tanks or other receptacles for air under pressure including a valve stem secured to the tire, tank or other receptacle and having a free air passage therethrough and with its outer portion tubular, a valve carrying member longitudinally movable in said tubular portion of the valve stem and carrying a needle valve for controlling the air passage through the valve stem, said valve carrying member having pressure indications thereon, and a spring construction composed of oppositely wound connected sections for yieldingly connecting the valve carrying member with the valve stem arranged so that while expanding and contracting it will not tend to turn said valve carrying member in the valve stem.

6. An air valve for pneumatic tires, tanks or other receptacles for air under pressure including a valve stem secured to the tire, tank or other receptacle and having a free air passage therethrough and with its outer portion tubular, a valve carrying member longitudinally movable in said tubular portion of the valve stem and carrying an integral valve for controlling the air passage through the valve stem, said valve carrying member having pressure indications thereon, a right and left spiral spring for connecting the valve carrying member with the valve stem and resisting the movement of the valve carrying member and means to connect the meeting ends of the springs together.

7. An air valve for pneumatic tires, tanks or other receptacles for air under pressure including a valve stem secured to the tire, tank or other receptacle and having an air passage therethrough and with its outer portion tubular, a valve carrying member longitudinally movable in said tubular portion of the valve stem and carrying an integral valve for controlling the air passage through the valve stem, said valve carrying member having pressure indications thereon, and a spring construction for yieldingly connecting the valve carrying member with the valve stem arranged so that while expanding and contracting it will not tend to turn said valve carrying member in the valve stem, said spring construction being formed of two oppositely coiled spiral springs with their adjacent ends secured together.

8. An air valve for pneumatic tires, tanks or other receptacles for air under pressure, including a valve stem secured to the tire, tank or other receptacle and having a free air passage therethrough and with its outer portion tubular, a valve carrying member longitudinally movable in said tubular portion of the valve stem and carrying a valve at its inner end for controlling the air passage through the valve stem, said valve carrying member having pressure indications thereon, said valve carrying member having a vertical opening and a transverse opening communicating with the lower end of the vertical opening, and an air tight elastic tubular connection between the inner part of the valve stem and said valve carrying member through which the air under pressure in said tire, tank or other receptacle directly acts on said valve carrying member and causes its actuation, whereby it indicates the air pressure, said valve carrying member and outer tubular portion of the valve stem being so arranged that said member can have no angular movement.

9. An air valve for pneumatic tires, tanks or other receptacles for air under pressure, including a valve stem secured to the tire, tank or other receptacle and having a free air passage therethrough, a sleeve screwed on said stem and extending outwardly therefrom, a valve carrying member longitudinally movable in said sleeve and having graduations thereon and also carrying a valve at its inner end for controlling the air passage therethrough, an air-tight elastic tubular connection between said valve carrying member and the valve stem, a pair of oppositely wound springs surrounding said air-tight elastic connection for yieldingly connecting said valve carrying member and valve stem and resisting the outward movement of said valve carrying member and means to connect the meeting ends of said springs, said valve carrying member and sleeve being so arranged that said member can have no angular movement in the sleeve.

In witness whereof, I have hereunto affixed my signature.

CHAUNCEY B. EARNHEART.